United States Patent
Hsu et al.

(10) Patent No.: US 8,952,909 B2
(45) Date of Patent: Feb. 10, 2015

(54) CAPACITIVE TOUCH PANEL AND TOUCH DETECTION METHOD OF THE SAME

(75) Inventors: Chao-Yong Hsu, Changhua (TW); Shih-Hung Huang, Zhongli (TW); Hung-Hsiang Chen, Zhongli (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 453 days.

(21) Appl. No.: 13/463,904

(22) Filed: May 4, 2012

(65) Prior Publication Data

US 2013/0093716 A1 Apr. 18, 2013

(30) Foreign Application Priority Data

Oct. 14, 2011 (TW) .............................. 100137393 A

(51) Int. Cl.
*G06F 3/041* (2006.01)
*G06F 3/044* (2006.01)

(52) U.S. Cl.
CPC ...... *G06F 3/044* (2013.01); *G06F 2203/04112* (2013.01)
USPC .......................... 345/173; 345/174; 178/18.06

(58) Field of Classification Search
USPC ............ 345/173, 174, 156; 178/18.01, 18.05, 178/18.06
See application file for complete search history.

(56) References Cited

U.S. PATENT DOCUMENTS

| | | | | |
|---|---|---|---|---|
| 8,284,080 | B2* | 10/2012 | Ng et al. | 341/26 |
| 2010/0328255 | A1* | 12/2010 | Ishizaki et al. | 345/174 |
| 2011/0102353 | A1* | 5/2011 | Kim et al. | 345/173 |
| 2011/0210934 | A1* | 9/2011 | Lee et al. | 345/173 |

FOREIGN PATENT DOCUMENTS

| | | |
|---|---|---|
| CN | 101593065 A | 12/2009 |
| TW | M364912 U1 | 9/2009 |
| TW | 201019184 | 5/2010 |
| TW | 201131444 A1 | 9/2011 |

OTHER PUBLICATIONS

English translation of abstract of TW 201019184.

* cited by examiner

*Primary Examiner* — Priyank Shah
(74) *Attorney, Agent, or Firm* — CKC & Partners Co., Ltd.

(57) ABSTRACT

A capacitive touch panel comprises a touch detection array having rows of first direction detection units and columns of second direction detection units, shared scan lines, independent scan lines and a driver control module. The first direction detection units are divided into a first group and a second group of rows arranged in an alternating manner. Each shared scan line is connected to one row of the first direction detection units in the first group and one column of the second direction detection units. Each independent scan line is connected to one row of the first direction detection units or one column of the second direction detection units that is not connected to the shared scan lines. The driver control module is connected to the shared scan lines and the independent scan lines to perform scanning processes to detect a touch input. A touch detection method is also disclosed.

9 Claims, 5 Drawing Sheets

CAPACITIVE TOUCH PANEL AND TOUCH DETECTION METHOD OF THE SAME

RELATED APPLICATIONS

This application claims priority to Taiwan Application Serial Number 100137393, filed Oct. 14, 2011, which is herein incorporated by reference.

BACKGROUND

1. Technical Field

The present disclosure relates to a touch panel. More particularly, the present disclosure relates to a capacitive touch panel and a touch detection method of the same.

2. Description of Related Art

Touch panels are becoming increasingly important in view of the growing popularity of smartphones and tablet personal computers. The capacitive touch panel is one type of touch panel that determines the location of a touch input according to a detection of a voltage drop, in which said voltage drop is generated by a capacitance change of the panel caused by the touch input and is detected by sensors formed in the panel. The sensors are connected to a processor through scan lines such that the processor is able to determine the location of the touch input according to the signals generated by the sensors. When the touch resolution of a touch panel is raised to realize more accurate touch detection, it is necessary to increase the number of the detection units. However, when the number of the detection units is increased, the number of the scan lines extending between the detection units and the processor must also be increased. As a result, manufacturing costs rise.

Accordingly, a capacitive touch panel and a touch detection method of the same are needed to overcome the above issues.

SUMMARY

An aspect of the present disclosure is to provide a capacitive touch panel. The capacitive touch panel comprises a touch detection array, a plurality of shared scan lines, a plurality of independent scan lines and a driver control module. The touch detection array comprises a plurality of rows of first direction detection units and a plurality of columns of second direction detection units. The plurality of rows of first direction detection units are divided into a first group and a second group of rows of the first direction detection units. The rows of the first group are arranged in an alternating manner with the rows of the second group. Each of the shared scan lines is connected to one row of the first direction detection units in the first group and one column of the second direction detection units. Each of the independent scan lines is connected to one row of the first direction detection units that is not connected to the shared scan lines or one column of the second direction detection units that is not connected to the shared scan lines. The driver control module is connected to the shared scan lines and the independent scan lines to perform scanning processes to detect a touch input from the touch detection array.

In an embodiment of the present disclosure, an M−1-th row or an M+1-th row of the first group of rows of the first direction detection units is not connected to an N−1-th column of the second direction detection units or an N+1-th column of the second direction detection units when an M-th row of the first group of rows of the first direction detection units and an N-th column of the second direction detection units are connected to one of the shared scan lines.

In another embodiment of the present disclosure, the touch detection array is disposed in a display area. Each of the first direction detection units and the second direction detection units is a touch pad. Each of the first direction detection units and the second direction detection units comprises conductive glass.

In another embodiment of the present disclosure, the driver control module scans the rows of the first direction detection units that are connected to the independent scan lines to retrieve a first touch signal according to the touch input and scans the columns of the second direction detection units to retrieve a second touch signal according to the touch input. The driver control module further determines a substantial touch position according to a comparison with the first touch signal and the second touch signal.

Another aspect of the present disclosure is to provide a touch detection method. The touch detection method comprises the steps outlined below. A capacitive touch panel comprising a plurality of rows of first direction detection units and a plurality of columns of second direction detection units is provided, wherein the plurality of rows of first direction detection units are divided into a first group and a second group of rows of first direction detection units. The rows of the first group are arranged in an alternating manner with the rows of the second group. Each of a plurality of shared scan lines is connected to one row of the first direction detection units in the first group and one column of the second direction detection units. Each of a plurality of independent scan lines is connected to one row of the first direction detection units that is not connected to the shared scan lines or one column of the second direction detection units that is not connected to the shared scan lines. The rows of the first direction detection units that are connected to the independent scan lines are scanned to retrieve a first touch signal according to a touch input. The columns of the second direction detection units are scanned to retrieve a second touch signal according to the touch input. A substantial touch position is determined according to a comparison between the first touch signal and the second touch signal.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
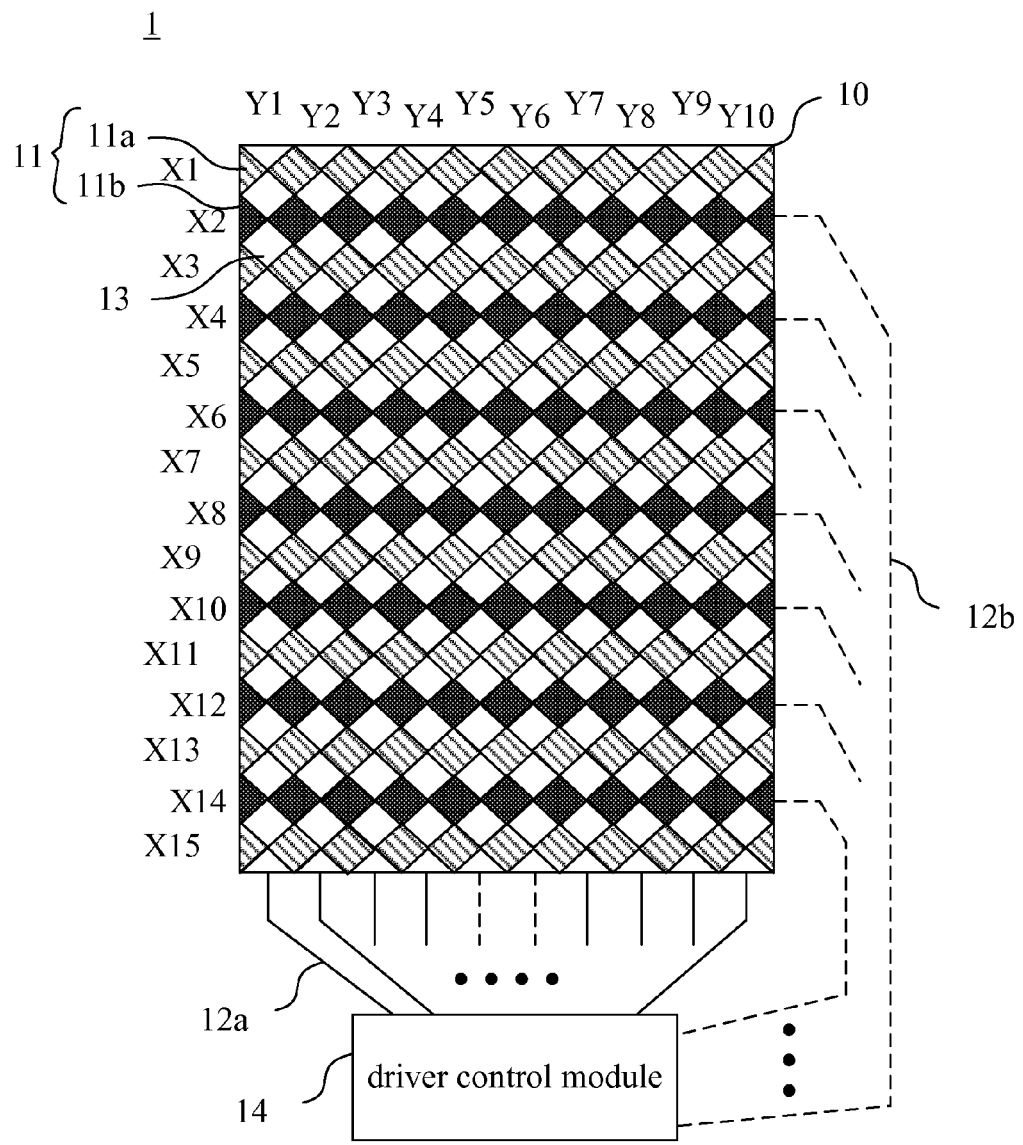
FIG. 1 is a top view of a capacitive touch panel in an embodiment of the present invention.

Reference will now be made in detail to the present embodiments of the disclosure, examples of which are illus- FIG. 1 is a top view of a capacitive touch panel 1 in an embodiment of the present invention. The capacitive touch panel 1 comprises a touch detection array 10, scan lines and a driver control module 14.

The touch detection array 10 is substantially in a display area. The display area is an area having pixels (not shown) to generate a display frame which can be visually perceived by a user. In different embodiments, the frame can be displayed by transmitting display data from a driving circuit or other modules to the pixels of the display area.

The touch detection array 10 comprises a plurality of first direction detection units 11 and a plurality of second direction detection units 13. Each of the first direction detection units 11 is depicted as a diamond-shaped block filled with oblique lines or as a black diamond-shaped block in FIG. 1. Each of the second direction detection units 13 is depicted as a white diamond-shaped block in FIG. 1. Each of the first and the second direction detection units 11 and 13 is a touch pad. In an embodiment, each of the touch pads can be formed by conductive glass (e.g. Indium tin oxide (ITO)) such that a variation of the capacitance of the touch pad can be generated when a touch input is applied to the touch pad. The detection mechanism can be realized through such a use of conductive glass for each of the touch pads, i.e., for each of the first and second direction detection units 11, 13.

The touch detection array 10 comprises a plurality rows of the first direction detection units 11 and a plurality rows of the second direction detection units 13. In the present embodiment, there are fifteen scan lines in the X direction connecting to the plurality rows of first direction detection units 11 and ten scan lines in the Y direction connecting to the plurality rows of second direction detection units 13. The rows of the first direction detection units 11 are labeled X1, X2, . . . , X15 in FIG. 1. The columns of the second direction detection units 13 are labeled Y1, Y2, . . . , Y10 in FIG. 1. However, the number of the rows and columns of the detection units 11, 13 can be modified in other embodiments.

The plurality of rows X1, X2, . . . , X15 of the first direction detection units 11 are divided into a first group and a second group of rows of the first direction detection units 11, in which the rows of the first group of the first direction detection units 11a are arranged in an alternating manner with the rows of the second group of the first direction detection units 11b. In the present embodiment, the first group of rows of the first direction detection units 11 comprises the rows X1, X3, X5, . . . , X15, in which the first direction detection units 11 forming these rows are depicted as a plurality of diamond-shaped blocks each filled with oblique lines and are further designated by the reference numeral 11a. The second group of rows of first direction detection units 11 comprises the rows X2, X4, X4, . . . , X14, in which the first direction detection units 11 forming these rows are depicted as a plurality of black diamond-shaped blocks and are further designated by the reference numeral 11b. Hence, the first group and the second group of rows of the first direction detection units 11 are arranged in an alternating manner as shown in FIG. 1.

The scan lines comprise a plurality of shared scan lines 12a and a plurality of independent scan lines 12b. The shared scan lines 12a are depicted as solid lines and the independent scan lines 12b are depicted as dashed lines in FIG. 1. Each of the shared scan lines 12a is connected to one row of the first direction detection units 11a in the first group and one column of the second direction detection units 13. For example, each of the shared scan lines 12a is connected to a combination of detection units that comprises one row and one column of detection units, such as the combinations of X1/Y10, X3/Y1, X5/Y9, X7/Y2, X9/Y8, X11/Y3, X13/Y7 and X15/Y2. Each combination of detection units shares one drive channel of the driver control module 14. On the other hand, the second direction detection units 13 in columns Y5, Y6 and the first direction detection units 11b in rows X2, X4, X6, . . . , X14 of the second group are not connected to the shared scan lines 12a. Each row X2, X4, X6, . . . , X14 of the first direction detection units 11 of the second group and each column Y5, Y6 of the second direction detection units 13 is connected to one of the independent scan lines 12b.

It is noted that the connection between the scan lines and the detection units described above is merely an example. In other embodiments, other connection arrangements may be employed. However, in an embodiment, an M−1-th row or an M+1-th row of the first group of rows of the first direction detection units 11a is not connected to an N−1-th column of the second direction detection units 13 or an N+1-th column of the second direction detection units 13 when an M-th row of the first group of rows of the first direction detection units 11a and an N-th column of the second direction detection units 13 are connected to one of the shared scan lines. For example, when row X5 (the third row of the first group) and column Y9 are connected together, row X3 (the second row of the first group) should not be connected to column Y8 or column Y10. Further, when row X7 (the fourth row of the first group) should not be connected to column Y8 or column Y10. Through such a configuration, misjudgment of the position of the touch input can be avoided.

The driver control module 14 is connected to the shared scan lines 12a and the independent scan lines 12b through the drive channels to perform scanning processes to detect a variation of the capacitance in the touch detection array 10 caused by a touch input by using the shared scan lines 12a and the independent scan lines 12b. In an embodiment, the driver control module 14 scans the rows of first direction detection units 11 that are connected to the independent scan lines 12b to retrieve a first touch signal according to a touch input and scans the columns of second direction detection units 13 to retrieve a second touch signal according to the touch input. The scanning processes performed on the second direction detection units 13 can scan the detection units that are connected to the independent scan lines 12b and the shared scan lines 12a. For example, the driver control module 14 performs scanning processes on rows X2, X4, X6, . . . , X14 to retrieve the first touch signal. The driver control module 14 can further perform scanning processes on columns Y1, Y2, . . . , Y10 to retrieve the second touch signal. After retrieving the first and the second touch signals, the driver control module 14 determines a substantial touch position according to a comparison between the first touch signal and second touch signal.

Figure 2:
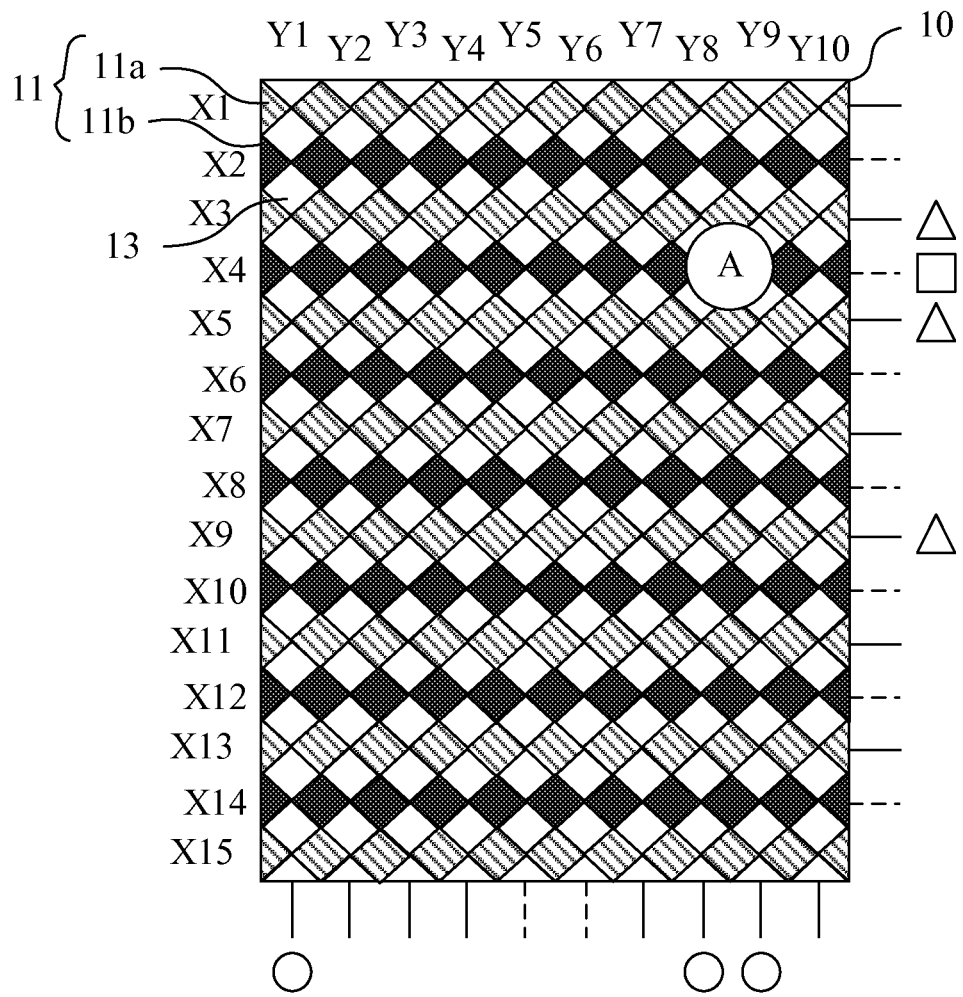
FIG. 2 is a top view of the capacitive touch panel shown in a state receiving a touch input in an embodiment of the present invention.

FIG. 2 is a top view of the capacitive touch panel 1 shown in a state receiving a touch input in an embodiment of the present invention. In the present embodiment, the touch input is applied at point A. Therefore, the driver control module 14 (see FIG. 1) performs scanning processes on rows X2, X4, X6, . . . , X14 to retrieve the first touch signal corresponding to the square at row X4 depicted in FIG. 2. The driver control module 14 further performs scanning processes on columns Y1, Y2, . . . , Y10 to retrieve the second touch signal corresponding to the circles at columns Y1, Y8 and Y9 depicted in FIG. 2. Since columns Y1, Y8 and Y9 are connected to X3, X9 and X5 respectively through the shared scan lines 12a, the second touch signal corresponding to the triangles at rows X3, X5 and X9 are retrieved as well. Typically, the size of each of the detection units 11, 13 is about 5 mm$^2$ and the size of a common touch object such as the finger of a human is about 7-8 mm². Hence, the driver control module 14 can determine that the touch input is actually applied on columns Y8 and Y9, since the second touch signal at column Y1 is too far away from the second touch signal at columns Y8 and Y9. Further, the driver control module 14 can determine that the substantial position of the touch input is at rows X3 and X5 instead of X9 according to the first touch signal at row X4. Accordingly, the position of the touch input at point A can be determined.

Figure 3:
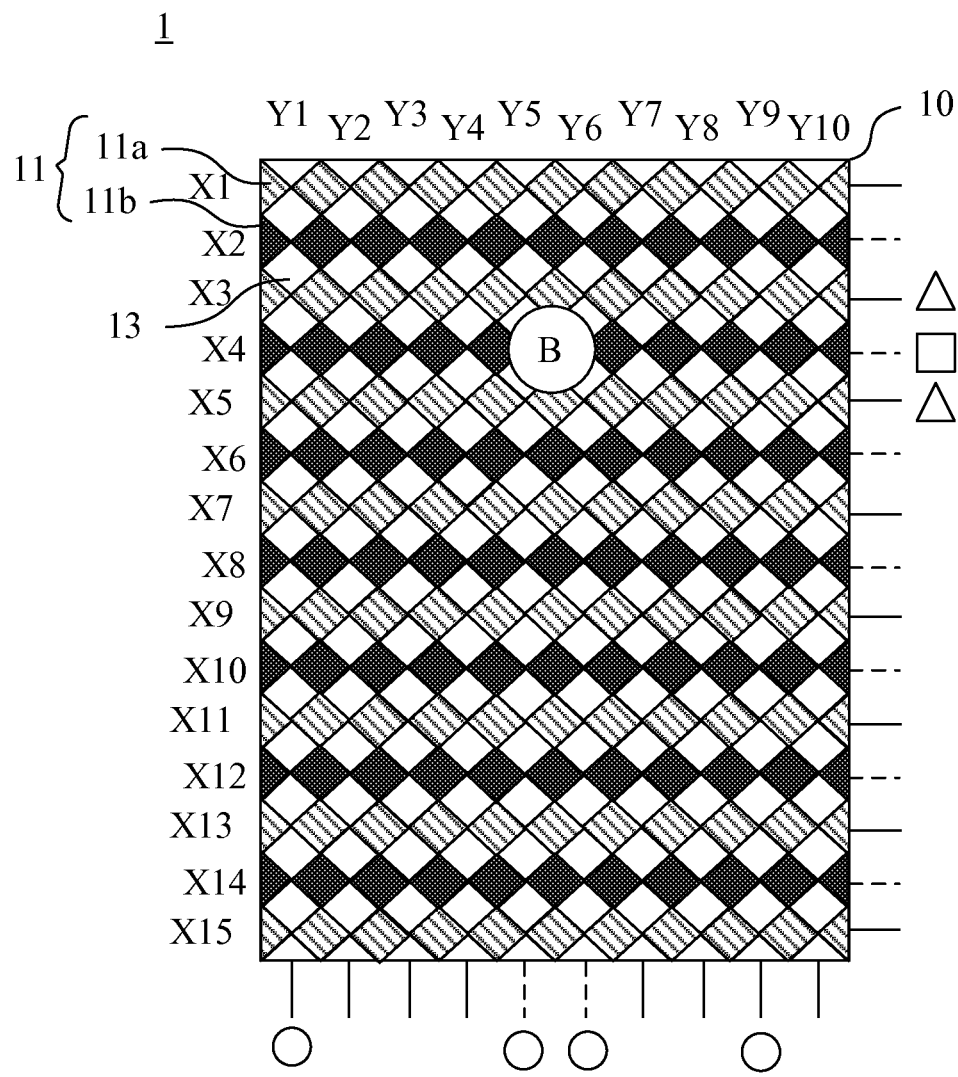
FIG. 3 is a top view of the capacitive touch panel shown in a state receiving a different touch input in an embodiment of the present invention.

FIG. 3 is a top view of the capacitive touch panel 1 shown in a state receiving a different touch input in an embodiment of the present invention.

In the present embodiment, the touch input is applied at point B. Therefore, the driver control module 14 performs scanning processes on rows X2, X4, X6, . . . , X14 to retrieve the first touch signal corresponding to the square at row X4 depicted in FIG. 3. The driver control module 14 further performs scanning processes on columns Y1, Y2, . . . , Y10 to retrieve the second touch signal corresponding to the circles at columns Y5 and Y6 depicted in FIG. 3. Since columns Y1 and Y9 are connected to X3 and X5 respectively through the shared scan lines 12a, the second touch signal corresponding to the triangles and the circles at rows X3, X5 and columns Y1, Y9 are retrieved as well. The driver control module 14 can determine that the touch input is actually applied on columns Y5 and Y6 according to the area of the detection units 11, 13 and the area of the touch object. Further, the driver control module 14 can determine that the substantial position of the touch input is at rows X3 and X5 according to the first touch signal at row X4. Accordingly, the position of the touch input at point B can be determined.

Figure 4:
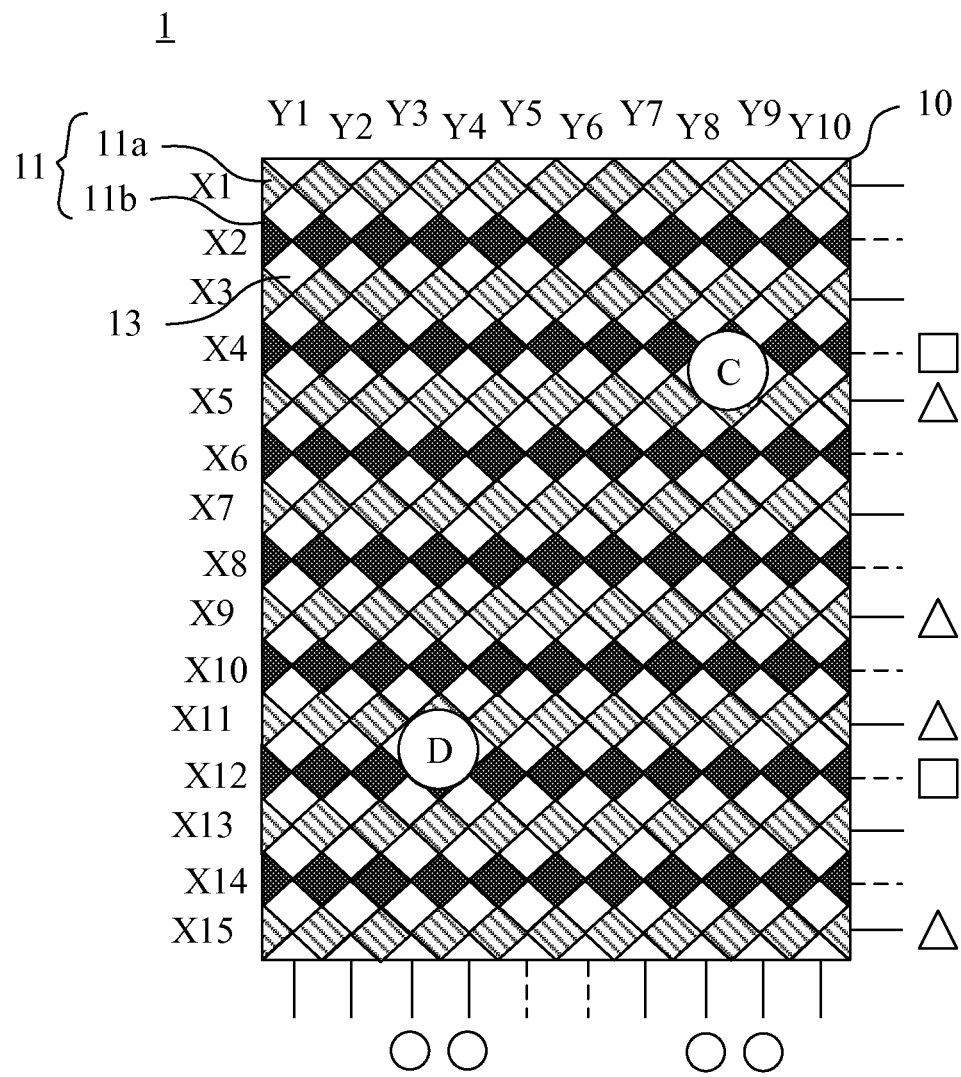
FIG. 4 is a top view of the capacitive touch panel shown in a state receiving two touch inputs in an embodiment of the present invention.

FIG. 4 is a top view of the capacitive touch panel 1 shown in a state receiving two touch inputs in an embodiment of the present invention.

In the present embodiment, the touch input is applied at points C and D. Therefore, the driver control module 14 performs scanning processes on rows X2, X4, X6, . . . , X14 to retrieve the first touch signal corresponding to the squares at rows X4 and X12 depicted in FIG. 4. The driver control module 14 further performs scanning processes on columns Y1, Y2, . . . , Y10 to retrieve the second touch signal corresponding to the circles at columns Y3, Y4, Y8 and Y9 depicted in FIG. 4. Since columns Y3, Y8 and Y9 are connected to X11, X9 and X5 respectively through the shared scan lines 12a, the second touch signal corresponding to the triangles at rows X5, X9, X11 and X15 are retrieved as well. The driver control module 14 can determine that the substantial position of the touch input is at rows X5 and X11 according to the first touch signal at row X4 and X12. Accordingly, the position of the touch inputs at points C and D can be determined.

The capacitive touch panel of the present invention can reduce the number of scan lines and the drive channels on the driver control module by using the shared scan lines. Accordingly, less scan lines can be used to manufacture a touch panel having a higher resolution or larger size. The manufacturing cost of the panel and the driver control module can thus be reduced. Furthermore, the scan frequency of the system of the capacitive touch panel of the present invention can be increased to accomplish a higher efficiency.

It is noted that the first direction detection units 11 are arranged in a vertical direction and the second direction detection units 13 are arranged in a horizontal direction in the above embodiments. In other embodiments, the first direction detection units 11 can be arranged in the horizontal direction and the second direction detection units 13 can be arranged in the vertical direction. In other words, some of the detection units in the vertical direction can share the scan lines with the detection units in the horizontal direction and the other detection units in the vertical direction are connected to the independent scan lines. Further, each of the rows of the first direction detection units 11 in the first group is an odd number of row and each of the rows of the first direction detection units 11 in the second group is an even number of row. In other embodiments, each of the rows of the first direction detection units 11 in the first group can be an even number of row and each of the rows of the first direction detection units 11 in the second group can be an even number of row.

Figure 5:
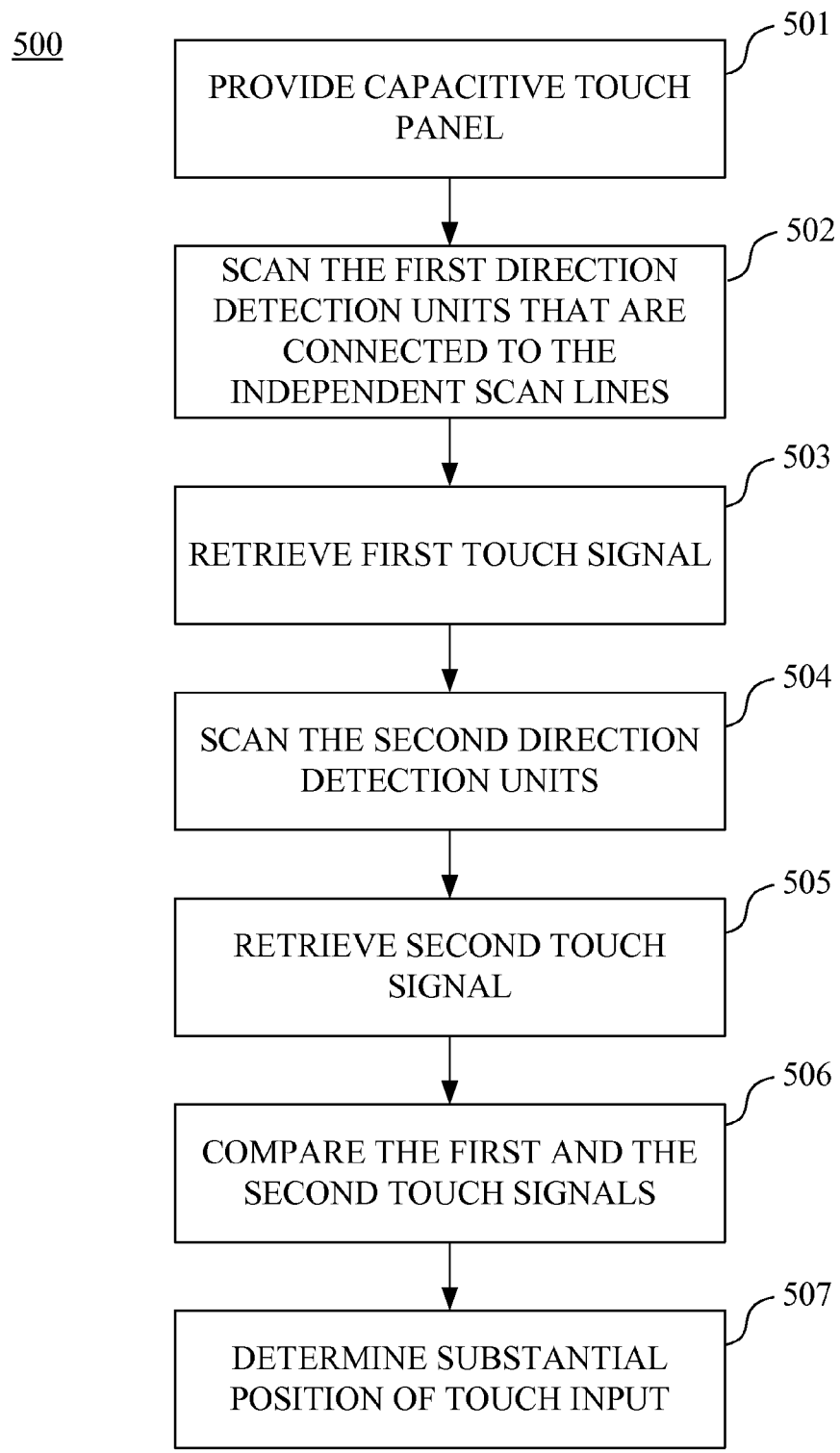
FIG. 5 is a flow chart of a touch detection method in an embodiment of the present invention.

FIG. 5 is a flow chart of a touch detection method 500 in an embodiment of the present invention. The touch detection method 500 can be used in the capacitive touch panel 1 depicted in FIG. 1. The touch detection method 500 comprises the steps outlined below. It should be noted that the steps are not recited in the sequence in which the steps are performed. That is, unless the sequence of the steps is expressly indicated, the sequence of the steps is interchangeable, and all or part of the steps may be simultaneously, partially simultaneously, or sequentially performed.

In step 501, the capacitive touch panel 1 depicted in FIG. 1 is provided. In step 502, the rows of the first direction detection units 11 that are connected to the independent scan lines 12b are scanned to retrieve a first touch signal according to the touch input in step 503. In step 504, the columns of the second direction detection units 13 are scanned to retrieve a second touch signal according to the touch input in step 505. In step 506, a comparison is made between the first touch signal and second touch signal to determine the substantial touch position in step 507.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A capacitive touch panel, comprising:
a touch detection array comprising:
    a plurality of rows of first direction detection units divided into a first group and a second group of rows of the first direction detection units, in which the rows of the first group are arranged in an alternating manner with the rows of the second group; and
    a plurality of columns of second direction detection units;
a plurality of shared scan lines each connected to one row of the first direction detection units in the first group and one column of the second direction detection units;
a plurality of independent scan lines each connected to one row of the first direction detection units that is not connected to the shared scan lines or one column of the second direction detection units that is not connected to the shared scan lines; and
a driver control module connected to the shared scan lines and the independent scan lines to perform scanning processes to detect a touch input from the touch detection array.
2. The capacitive touch panel of claim 1, wherein an M−1-th row or an M+1-th row of the first group of rows of the first direction detection units is not connected to an N−1-th column of the second direction detection units or an N+1-th column of the second direction detection units when an M-th row of the first group of rows of the first direction detection units and an N-th column of the second direction detection units are connected to one of the shared scan lines.

3. The capacitive touch panel of claim 1, wherein the touch detection array is disposed in a display area.

4. The capacitive touch panel of claim 1, wherein each of the first direction detection units and the second direction detection units is a touch pad.

5. The capacitive touch panel of claim 1, wherein each of the first direction detection units and the second direction detection units comprises conductive glass.

6. The capacitive touch panel of claim 1, wherein the driver control module scans the rows of the first direction detection units that are connected to the independent scan lines to retrieve a first touch signal according to the touch input and scans the columns of the second direction detection units to retrieve a second touch signal according to the touch input.

7. The capacitive touch panel of claim 6, wherein the driver control module further determines a substantial touch position according to a comparison with the first touch signal and the second touch signal.

8. A touch detection method, comprising:
providing a capacitive touch panel comprising a plurality of rows of first direction detection units and a plurality of columns of second direction detection units, wherein the plurality of rows of first direction detection units are divided into a first group and a second group of rows of the first direction detection units, in which the rows of the first group are arranged in an alternating manner with the rows of the second group;
connecting each of a plurality of shared scan lines to one row of the first direction detection units in the first group and one column of the second direction detection units;
connecting each of a plurality of independent scan lines to one row of the first direction detection units that is not connected to the shared scan lines or one column of the second direction detection units that is not connected to the shared scan lines;
scanning the rows of the first direction detection units that are connected to the independent scan lines to retrieve a first touch signal according to a touch input;
scanning the columns of the second direction detection units to retrieve a second touch signal according to the touch input;
determining a substantial touch position according to a comparison between the first touch signal and the second touch signal.

9. The touch detection method of claim 8, wherein an M−1-th row or an M+1-th row of the first group of rows of the first direction detection units is not connected to an N−1-th column of the second direction detection units or an N+1-th column of the second direction detection units when an M-th row of the first group of rows of the first direction detection units and an N-th column of the second direction detection units are connected to one of the shared scan lines.

* * * * *